(12) United States Patent
Lee

(10) Patent No.: US 8,892,044 B2
(45) Date of Patent: Nov. 18, 2014

(54) RECEPTION APPARATUS AND TRANSMISSION APPARATUS FOR SUPPORTING SCALABLE BANDWIDTH IN CARRIER AGGREGATION ENVIRONMENT

(71) Applicant: Electronics and Telecommunications Research Institute, Daejeon (KR)

(72) Inventor: Moon-Sik Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/029,691

(22) Filed: Sep. 17, 2013

(65) Prior Publication Data

US 2014/0016604 A1 Jan. 16, 2014

Related U.S. Application Data

(62) Division of application No. 13/284,768, filed on Oct. 28, 2011, now Pat. No. 8,565,700.

(30) Foreign Application Priority Data

Nov. 2, 2010 (KR) .................. 10-2010-0108202

(51) Int. Cl.
| | | |
|---|---|---|
| H04B 7/00 | (2006.01) | |
| H04L 5/00 | (2006.01) | |
| H04B 1/38 | (2006.01) | |
| H04W 92/02 | (2009.01) | |
| H04W 28/06 | (2009.01) | |
| H04W 72/00 | (2009.01) | |

(52) U.S. Cl.
CPC ............ *H04L 5/0064* (2013.01); *H04W 92/02* (2013.01); *H04L 5/001* (2013.01); *H04W 28/06* (2013.01); *H04W 72/00* (2013.01)
USPC ........................................ 455/59; 455/127.4

(58) Field of Classification Search
CPC ........................................................ H04L 5/00
USPC ................................................ 455/59, 127.4
See application file for complete search history.

(56) References Cited

U.S. PATENT DOCUMENTS

| | | | | |
|---|---|---|---|---|
| 2009/0003477 | A1* | 1/2009 | Nishio et al. ................. | 375/260 |
| 2010/0104001 | A1 | 4/2010 | Lee et al. | |
| 2010/0261443 | A1* | 10/2010 | Walley et al. ................ | 455/118 |

FOREIGN PATENT DOCUMENTS

KR    10-0789784  B1    12/2007

* cited by examiner

*Primary Examiner* — Lee Nguyen

(57) ABSTRACT

Provided are a reception apparatus and transmission apparatus for supporting a scalable bandwidth in a carrier aggregation environment. The reception apparatus and transmission apparatus can link carrier aggregation technology and scalable bandwidth technology by supporting a scalable bandwidth having different bandwidths in size in a carrier aggregation environment, thereby enhancing compatibility between different wireless communication systems.

6 Claims, 5 Drawing Sheets

RECEPTION APPARATUS AND TRANSMISSION APPARATUS FOR SUPPORTING SCALABLE BANDWIDTH IN CARRIER AGGREGATION ENVIRONMENT

CROSS-REFERENCE TO RELATED APPLICATION

The present application is a divisional of U.S. patent application Ser. No. 13/284,768 filed on Oct. 28, 2011, which claims the benefit under 35 U.S.C. §119(a) of Korean Patent Application No. 10-2010-0108202, filed on Nov. 2, 2010, the disclosures of which are incorporated by reference in their entirety for all purposes.

BACKGROUND

1. Field of the Invention

The following description relates to signal reception and signal transmission technology, and more particularly, to a reception apparatus and a transmission apparatus for supporting a scalable bandwidth in a carrier aggregation environment.

2. Description of the Related Art

That a base station may have different bandwidths in size and a mobile terminal should be able to make a communication in such an environment was standardized in Release 8/9 of 3rd Generation Partnership Project-Long Term Evolution (3GPP LTE).

That is, the mobile terminal should have a reception structure for supporting a scalable bandwidth so that the mobile terminal itself can be connected to a variety of base stations having different bandwidths to perform communication. The base station has bandwidths of 1.4, 3, 5, 10, 15 and 20 MHz in 3GPP LTE Release 8/9.

Meanwhile, in a resource allocation method of a downlink synchronization signal and physical broadcast channel (PBCH), a bandwidth is 1.25 MHz regardless of a total transmission bandwidth of a base station and the bandwidth is located in the center of the total transmission bandwidth.

Recently, 3GPP has been developing a technology standardization of LTE-Advanced (Release 10), and a carrier aggregation technology is being magnified as a core technology among 3GPP LTE-Advanced standardization fields.

SUMMARY OF THE INVENTION

Exemplary embodiments provide a reception apparatus and a transmission apparatus for supporting a scalable bandwidth in a carrier aggregation environment capable of linking carrier aggregation technology and scalable bandwidth technology by supporting a scalable bandwidth that has different bandwidths in size in a carrier aggregation environment where a plurality of carriers are collectively used.

According to an exemplary aspect, there is provided a reception apparatus for supporting a scalable bandwidth in a carrier aggregation environment, including at least two band pass filters configured to filter a reception signal received from an antenna in different bands, respectively; a reception path forming unit configured to form a plurality of reception path modules in which center frequencies of the reception signal are different by changing a center frequency of the reception signal filtered in different bands by the respective band pass filters, and adjust a bandwidth of the reception signal of at least one reception path module in which the center frequency of the reception signal has been changed; and a control unit configured to demodulate the reception signal received through the respective reception path modules of the reception path forming unit and output a center frequency control signal used to change the center frequency of the reception signal and a bandwidth control signal used to adjust the bandwidth of the reception signal, to the respective reception path modules.

According to another exemplary aspect, there is provided a transmission apparatus for supporting a scalable bandwidth in a carrier aggregation environment, including at least two band pass filters configured to filter a transmission signal in different bands, respectively and output the filtered signal to an antenna; a transmission path forming unit configured to form a plurality of transmission path modules in which center frequencies of the transmission signal are different by changing a center frequency of the transmission signal filtered in different bands by the respective band pass filters, and adjust a bandwidth of the transmission signal of at least one transmission path module in which the center frequency of the transmission signal has been changed; and a control unit configured to modulate the transmission signal transmitted through the respective transmission path modules of the transmission path forming unit, and output a center frequency control signal used to change the center frequency of the transmission signal and a bandwidth control signal used to adjust the bandwidth of the transmission signal, to the respective transmission path modules.

According to the present invention, it is possible to link carrier aggregation technology and scalable bandwidth technology by supporting a scalable bandwidth having different bandwidths in size in a carrier aggregation environment where a plurality of carriers are collectively used, thereby enhancing a compatibility between different wireless communication systems.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain aspects of the invention.

DETAILED DESCRIPTION OF EMBODIMENTS

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. Also, descriptions of well-known functions and constructions are omitted to increase clarity and conciseness.

Figure 1:
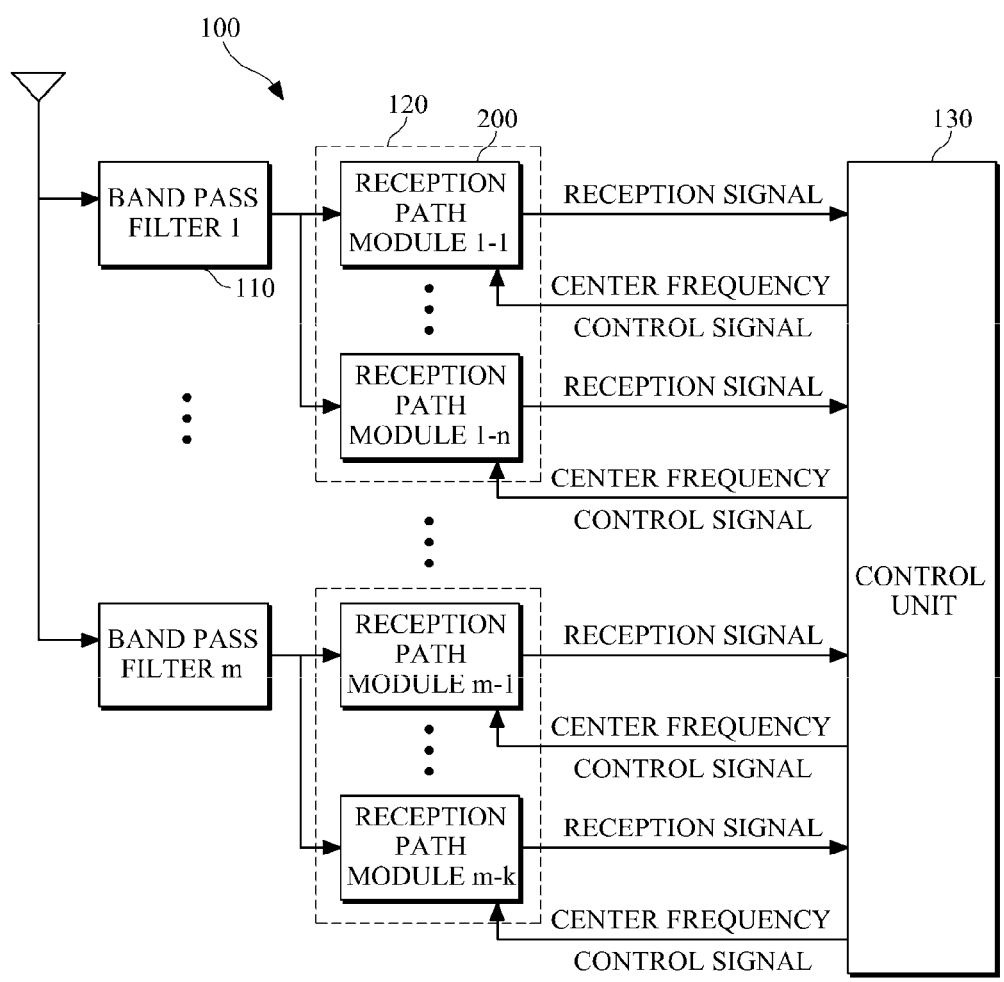
FIG. 1 is a block diagram of a reception apparatus for supporting a scalable bandwidth in a carrier aggregation environment according to an exemplary embodiment of the present invention.

FIG. 1 is a block diagram of a reception apparatus for supporting a scalable bandwidth in a carrier aggregation environment according to an exemplary embodiment of the present invention. Referring to FIG. 1, a reception apparatus 100 for supporting a scalable bandwidth in a carrier aggregation environment according to the exemplary embodiment includes at least two band pass filters 110, reception path forming units 120, and a control unit 130.

The band pass filters 110 filter a reception signal received from an antenna in different bands, respectively. For example, each of the band pass filters 110 may be implemented to filter the reception signal received from the antenna in adjacent bands.

In a carrier aggregation environment, a plurality of component carriers are collectively transmitted and received. For example, in a Generation Partnership Project-Long Term Evolution (GPP LTE)-Advanced (Release 10) standard, a mobile terminal can use 5 component carriers to the maximum, the maximum bandwidth that the mobile terminal can use is 100 MH, and one component carrier has bandwidths of 1.4, 3, 5, 10, 15 and 20 MHz, like in 3GPP LTE Release 8/9.

A plurality of component carriers are classified into a primary component carrier (PCC) and a secondary component carrier (SCC). An important information provision such as a signaling connection to a mobile terminal is performed through the PCC, and the SCC is used to provide a higher transmission rate. The PCC serves as a core carrier to manage all component carriers and is defined for every mobile terminal.

When a reception signal in which a plurality of component carriers are collected is received through an antenna in a carrier aggregation environment, the respective band pass filters 110 filter the reception signal in different bands, respectively. In other words, the reception signal in which the plurality of component carriers are collected is split in respective component carrier bands by the respective band pass filters 110.

The reception path forming unit 120 changes a center frequency of the reception signal that is filtered in different bands by the respective band pass filters 110, forms a plurality of reception path modules 200 in which center frequencies of the reception signal are different, and adjusts a bandwidth of the reception signal of at least one reception path module 200 in which center frequencies of the reception signal have been changed.

Here, any one of the reception path modules 200 may be a path to receive a system control signal such as a signal for synchronization or a signal for handover. Meanwhile, at least one of the reception path modules 200 may be a path to receive component-carrier-specific data in a carrier aggregation environment.

In other words, the plurality of reception path modules 200 implemented in the reception path forming unit 120 precisely adjust a bandwidth of the reception signal to have different bandwidths through center frequency change and bandwidth control of the component carriers split by the band pass filters 110, thereby supporting a scalable bandwidth.

The control unit 130 demodulates the reception signal received through each of the reception path modules 200 of the reception path forming unit 120, and outputs a center frequency control signal to change the center frequency of the reception signal and a bandwidth control signal to adjust the bandwidth of the reception signal, to each of the reception path modules 200.

In other words, for the respective component carriers filtered in different bands by the respective band pass filters 110, the respective reception path modules 200 of the reception path forming unit 120 perform center frequency change and bandwidth control of the component carriers according to the center frequency control signal to change the center frequency of the reception signal from the control unit 130 and the bandwidth control signal to adjust a bandwidth of the reception signal, so that carrier aggregation technology and scalable bandwidth technology can be linked. Thus, compatibility between different wireless communication systems can be enhanced.

Figure 2:
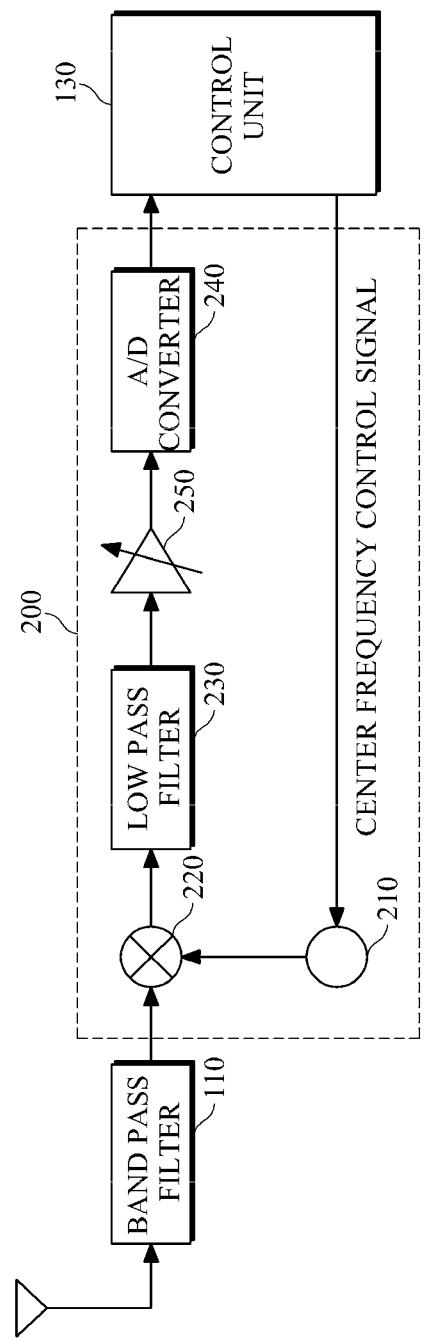
FIG. 2 is a block diagram of a reception path module of a reception apparatus for supporting a scalable bandwidth in a carrier aggregation environment according to an exemplary embodiment of the present invention.
Figure 3:
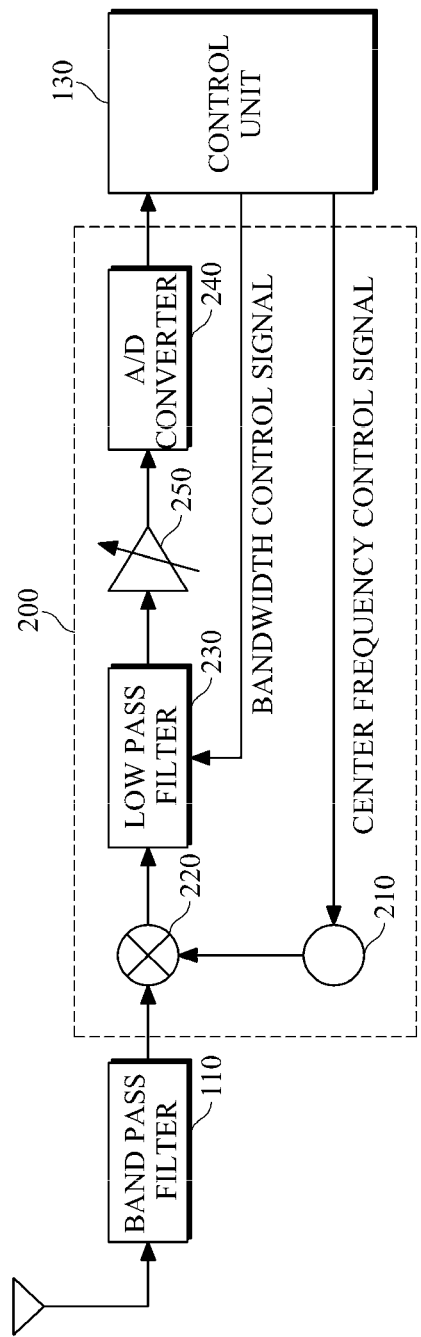
FIG. 3 is a block diagram of a reception path module of a reception apparatus for supporting a scalable bandwidth in a carrier aggregation environment according to another exemplary embodiment of the present invention.

FIG. 2 is a block diagram of a reception path module of a reception apparatus for supporting a scalable bandwidth in a carrier aggregation environment according to an exemplary embodiment of the present invention, and FIG. 3 is a block diagram of a reception path module of a reception apparatus for supporting a scalable bandwidth in a carrier aggregation environment according to another exemplary embodiment of the present invention.

According to an additional aspect, as illustrated in FIGS. 2 and 3, each of the reception path modules 200 of the reception path forming unit 120 may be implemented to include a local oscillator 210, a mixer 220, a low pass filter 230, and an analog/digital (A/D) converter 240.

The local oscillator 210 generates a local oscillation frequency signal to correct a deviation between a frequency of the reception signal filtered by the band pass filters 110 and a center frequency thereof, according to a center frequency control signal output from the controller 130.

The mixer 220 mixes the local oscillation frequency signal generated by the local oscillator 220 and the reception signal filtered by the band pass filters 110 and corrects a deviation between the frequency of the reception signal filtered by the band pass filters 110 and the center frequency.

The low pass filter 230 performs a low-pass filtering of the mixed signal produced by the mixer 220 and outputs a base band signal whose center frequency has been changed. Here, when the corresponding reception path module 200 is a path to receive a system control signal such as a signal for synchronization or a signal for handover, the low pass filter 230 may be implemented not to support a scalable bandwidth as illustrated in FIG. 2.

Meanwhile, when the corresponding reception path module 200 is a path to receive component-carrier-specific data in a carrier aggregation environment, the low pass filter 230 may be implemented to support a scalable bandwidth as illustrated in FIG. 3.

In this case, the low pass filter 230 is used as a scalable low pass filter. The scalable lows pass filter adjusts a bandwidth to be matched to a component-carrier-specific frequency band in a carrier aggregation environment according to the bandwidth control signal output from the control unit 130, thereby outputting a base band signal. Thus, carrier aggregation technology and scalable bandwidth technology can be linked, and compatibility between different wireless communication systems can be enhanced.

The A/D converter 240 converts the base band signal output by the low pass filter 230 into a digital signal and outputs the digital signal. The digital reception signal converted and output by the A/D converter 240 is demodulated and processed by the control unit 130.

For example, when the reception signal is a system control signal such as a signal for synchronization or a signal for handover, the control unit 130 performs a process for system control such as synchronization or handover. Meanwhile, when the reception signal is a signal to receive component-carrier-specific data in a carrier aggregation environment, the control unit 130 performs a component-carrier-specific data reception process.

Accordingly, a scalable bandwidth for each of the component carriers can be supported by the reception path modules 200 having such a constitution in a carrier aggregation environment in which the plurality of carriers are collectively used, and compatibility between different wireless communication systems can be enhanced by linking carrier aggregation technology and scalable bandwidth technology.

Meanwhile, according to an additional aspect of the present invention, each of the reception path modules 200 may further include an automatic gain controller (AGC) 250. The AGC 250 automatically controls a gain of the base band signal output by the low pass filter 230 to maintain a constant output despite a change in the input of the base band signal output by the low pass filter 230.

In this way, the output of the reception signal output to the control unit 130 through the AGC 250 can be maintained at a constant level despite a change in the input of the reception signal, and receiving performance can be enhanced.

Figure 4:
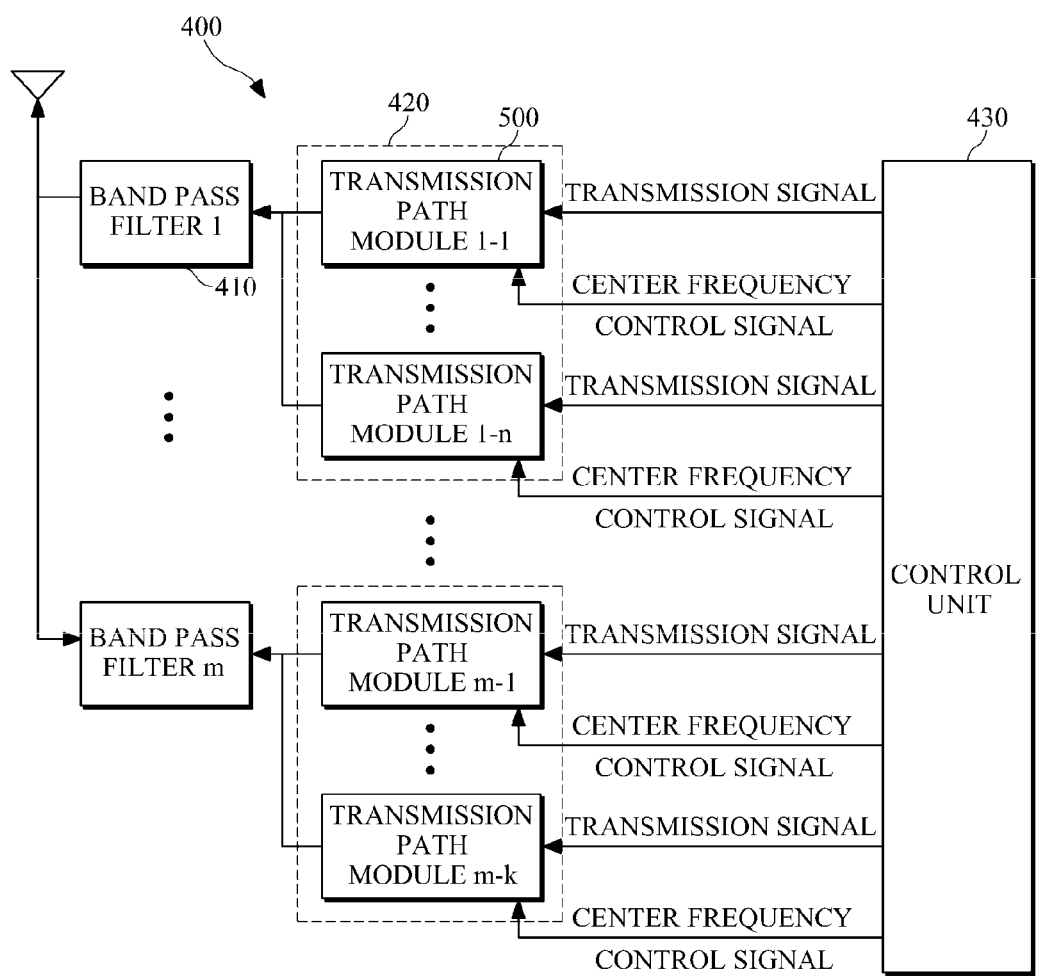
FIG. 4 is a block diagram of a transmission apparatus for supporting a scalable bandwidth in a carrier aggregation environment according to an exemplary embodiment of the present invention.

FIG. 4 is a block diagram of a transmission apparatus for supporting a scalable bandwidth in a carrier aggregation environment according to an exemplary embodiment of the present invention. A transmission apparatus 400 for supporting a scalable bandwidth in a carrier aggregation environment according to the exemplary embodiment includes at least two band pass filters 410, a transmission path forming unit 420, and a control unit 430.

The respective band pass filters 410 filter a transmission signal in different bands and output the filtered transmission signal to an antenna. For example, the band pass filters 410 may be implemented to filter the transmission signal output to the antenna in different bands, respectively. A component carrier filtered by each of the band pass filters 410 is wirelessly radiated through the antenna.

The transmission path forming unit 420 changes a center frequency of the transmission signal filtered in different bands by the respective band pass filters 410 to form a plurality of transmission path modules 500 in which center frequencies of the transmission signal are different, and adjusts a bandwidth of the transmission signal of at least one of the transmission path modules 500 in which a center frequency of the transmission signal has been changed. Here, the at least one of the transmission path modules 500 may be a path for component-carrier-specific data transmission in a carrier aggregation environment.

In other words, the plurality of transmission path modules 500 implemented in the transmission path forming unit 420 precisely control the bandwidth of the transmission signal to have different bandwidths through center frequency change and bandwidth control of the modulated transmission signal output from the control unit 430, thereby supporting a scalable bandwidth.

The control unit 430 modulates and outputs the transmission signal transmitted through the respective transmission path modules 500 of the transmission path forming unit 420, and outputs a center frequency control signal to change the center frequency of the transmission signal and a bandwidth control signal to adjust the bandwidth of the transmission signal, to the respective transmission path modules 500.

In other words, for the transmission signal modulated and output from the control unit 430, the respective transmission path modules 500 of the transmission path forming unit 420 perform center frequency change and bandwidth control of the transmission signal according to the center frequency control signal to change the center frequency of the transmission signal from the control unit 430 and the bandwidth control signal to adjust the bandwidth of the transmission signal so that carrier aggregation technology and scalable bandwidth technology can be linked. Thus, compatibility between different wireless communication systems can be enhanced.

Figure 5:
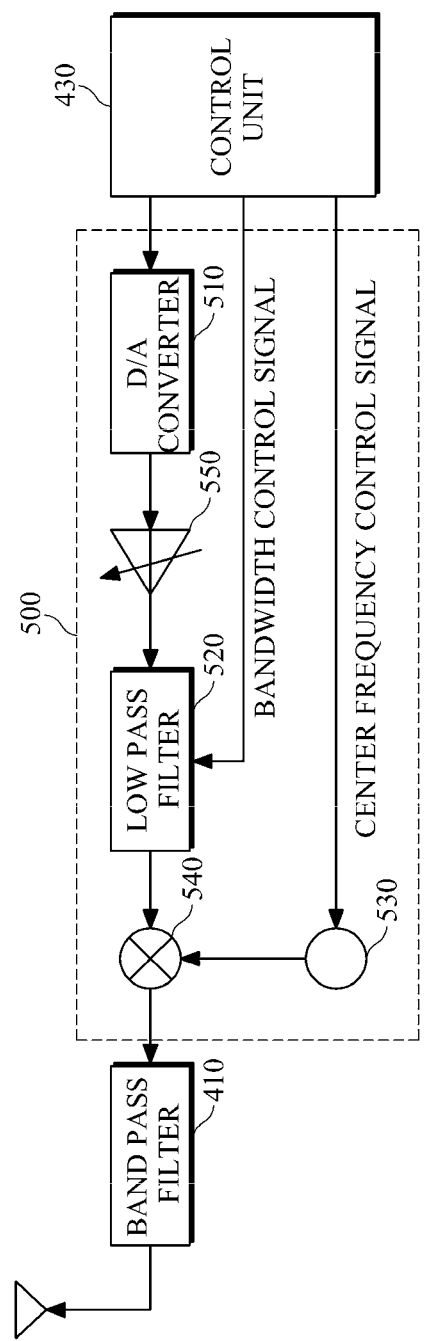
FIG. 5 is a block diagram of a transmission path module of a transmission apparatus for supporting a scalable bandwidth in a carrier aggregation environment according to an exemplary embodiment of the present invention.

FIG. 5 is a block diagram of a transmission path module of a transmission apparatus for supporting a scalable bandwidth in a carrier aggregation environment according to an exemplary embodiment of the present invention. According to an additional aspect, each of the transmission path modules 500 of the transmission path forming unit 420 may be implemented to include a digital/analog (D/A) converter 510, a low pass filter 520, a local oscillator 530, and a mixer 540, as illustrated in FIG. 5.

The D/A converter 510 converts a digital signal output from a controller 430 into an analog signal and outputs the analog signal. The digital signal modulated and output by the control unit 430 is converted into the analog signal by the D/A converter 510 and output.

The low pass filter 520 performs a low-pass filtering of the analog signal that has been converted by the D/A converter 510 and outputs a base band signal whose center frequency has been changed. When the corresponding reception path module 500 is a path for component-carrier-specific data transmission in a carrier aggregation environment, the low pass filter 520 may be implemented to support a scalable bandwidth.

In this case, a scalable low pas filter is used as the low pass filter 520. The scalable low pass filter adjusts a bandwidth to be matched to a component-carrier-specific frequency band in a carrier aggregation environment according to the bandwidth control signal output from the control unit 430, thereby outputting a base band signal. Thus, so that carrier aggregation technology and scalable bandwidth technology can be linked, and compatibility between different wireless communication systems can be enhanced.

The local oscillator 530 generates a local oscillation signal to correct a deviation between a frequency of the base band signal filtered by the low pass filter 520 and a center frequency thereof, according to the center frequency control signal output from the control unit 430.

The mixer 540 mixes a local oscillation frequency signal generated by the local oscillator 530 and the base band signal filtered by the low pass filter 520 and corrects a deviation between a frequency of the base band signal filtered by the low pass filter 520 and the center frequency.

A component carrier output by the mixer 540 and filtered by each band pass filter 410 is wirelessly radiated through an antenna. Accordingly, a scalable bandwidth for each of component carriers can be supported by the transmission path module 500 having such a constitution in a carrier aggregation environment in which the plurality of carriers are collectively used, and compatibility between different wireless communication systems can be enhanced by linking carrier aggregation technology and scalable bandwidth technology.

Meanwhile, according to an additional aspect, each of the transmission path modules 500 may further include an auto gain controller (AGC) 550. The AGC 550 automatically controls a gain of the analog signal converted by the D/A converter 510 to maintain a constant output despite a change in the input of the analog signal converted by the D/A converter 510.

In this way, the output of the transmission signal output to the band pass filter 410 through the AGC 550 can be maintained at a constant level, and transmission performance can be enhanced.

As described above, exemplary embodiments of the present invention can link the carrier aggregation technology and scalable bandwidth technology by supporting a scalable bandwidth having different bandwidths in a carrier aggregation environment in which a plurality of carriers are collectively used. Thus, compatibility between different wireless communication systems can be enhanced, and the objectives of the present invention suggested above can be accomplished.

The present invention can be applied to industries in a signal reception or transmission technology field and other application technology fields.

It will be apparent to those of ordinary skill in the art that various modifications can be made to the exemplary embodiments of the invention described above. However, as long as modifications fall within the scope of the appended claims and their equivalents, they should not be misconstrued as a departure from the scope of the invention itself.

What is claimed is:

1. A transmission apparatus for supporting a scalable bandwidth in a carrier aggregation environment, the transmission apparatus comprising:
    at least two band pass filters configured to filter a transmission signal in different bands, respectively, and output the filtered signal to an antenna;
    a transmission path forming unit configured to form a plurality of transmission path modules in which center frequencies of the transmission signal are different by changing a center frequency of the transmission signal filtered in different bands by the respective band pass filters, and adjust a bandwidth of the transmission signal of at least one transmission path module in which the center frequency of the transmission signal has been changed; and
    a control unit configured to modulate the transmission signal transmitted through the respective transmission path modules of the transmission path forming unit, and output a center frequency control signal used to change the center frequency of the transmission signal and a bandwidth control signal used to adjust the bandwidth of the transmission signal, to the respective transmission path modules.

2. The transmission apparatus of claim 1, wherein each of the transmission path modules includes:
    a digital/analog (D/A) converter configured to convert a digital signal output from the controller into an analog signal and output the analog signal;
    a low pass filter configured to perform a low-pass filtering of the analog signal converted by the D/A converter and output a base band signal whose center frequency has been changed;
    a local oscillator configured to generate a local oscillation frequency signal used to correct a deviation between a frequency of the base band signal filtered by the low pass filter and the center frequency, according to the center frequency control signal output from the control unit; and
    a mixer configured to mix the local oscillation frequency signal generated by the local oscillator and the base band signal filtered by the low pass filter and correct the deviation between the frequency of the base band signal filtered by the low pass filter and the center frequency.

3. The transmission apparatus of claim 2, wherein each of the transmission path modules further includes an automatic gain controller (AGC) configured to automatically control a gain of the analog signal converted by the D/A converter to maintain a constant output despite a change in an input of the analog signal converted by the D/A converter.

4. The transmission apparatus of claim 2, wherein at least one of the transmission path modules is a path used to transmit component-carrier-specific data in a carrier aggregation environment.

5. The transmission apparatus of claim 4, wherein the low pass filter is a scalable low pass filter configured to adjust a bandwidth to be matched to a component-carrier-specific frequency band in a carrier aggregation environment and output the baseband signal.

6. The transmission apparatus of claim 1, wherein each of the band pass filters the transmission signal output to the antenna in different bands, respectively.

* * * * *